United States Patent Office 3,196,505
Patented July 27, 1965

3,196,505
METHODS OF MAKING SAND MOLDS OR CORES FOR CASTING
Rolf Erhard Morén, Alfredshem, Sweden, assignor to Mo Och Domsjo Aktiebolag, Ornskoldsvik, Sweden, a corporation of Sweden
No Drawing. Filed Dec. 14, 1961, Ser. No. 159,467
Claims priority, application Sweden, Jan. 2, 1961, 21/61
4 Claims. (Cl. 22—193)

The present invention relates to a method of making sand molds or cores for metal casting. The main object of the invention is by means of a special binder combination to make sand molds and sand cores which are self-hardening, i.e. harden without any particular treatment when they are stored for a certain period of time. However, the molds and cores of this invention may also be hardened by treatment with carbon dioxide or by a combination of self-hardening and carbon dioxide treatment. They can also be hardened by drying in an oven in the usual manner, or by means of the so-called hot-box method, i.e. core making in a hot core-box, or by shell-moulding.

According to this invention, sand molds or cores are made from sand to which have been added an alkaline earth metal oxide or hydroxide and aluminous cement. It is preferable to add to the sand also one or more water-soluble organic binders, e.g. a water-soluble cellulose derivative.

The term "aluminous cement" refers to a hydraulic cement which differs from the usual Portland cement in that its active ingredient is calcium aluminate instead of calcium silicate. It was found that if this binder is combined with an alkaline earth metal oxide or hydroxide, preferably calcium oxide, calcium hydroxide, magnesium oxide or magnesium hydroxide, cores and molds are obtained which self-harden so that after a few hours they have sufficient strength for casting. If desired, it is possible to accelerate hardening by subjecting the mold or core to a brief treatment with carbon dioxide and thereupon it may self-harden, or the mold or core can be treated with carbon dioxide for a sufficient time to allow the core or mold to harden completely. It is also often suitable to add to the sand a water-soluble binder, e.g. water-soluble cellulose derivatives, starch, dextrin, sugars, molasses, alginates, various synthetic resin products, such as polyvinyl alcohol, polyvinyl acetate, urea-formaldehyde resin or melamine resin.

The amount of aluminous cement added should generally be about 0.1 to 5% by weight of the sand, while the amount of alkaline earth metal oxide or hydroxide should be 0.2 to 8%, preferably 1 to 8%, by weight based on the sand. In addition water should be added in sufficient amount to make the mix plastic and to supply the water required for setting of the cement. The amount of water will generally be 1 to 10% based on the weight of the sand. The amount of water-soluble binder should be 0.05 to 4% by weight of the sand.

In addition to the additives mentioned, it is possible to use other additives common in mold and core sand mixes, as desired, e.g. surface-active substances, amines such as mono- or triethanolamine, water glass, clay, soot, oils and other binders.

The blending of the mix can be carried out in an edge-runner mill, propeller mixer or other suitable mixing apparatus. Blending can as a rule take place a rather long time before the core or mold is to be formed, since at least with lower amounts of aluminous cement, the mix hardens only after 1 to 8 hours. If a longer period shall pass before the core or mold is to be formed, it is possible to mix the sand with all ingredients except the alkaline earth metal oxide or hydroxide and to add this shortly before the forming work is to be started. It has surprisingly been found that with some proportions of the various binder components according to this invention, the mix does not harden but can be stored for a considerably longer time if the alkaline earth metal oxide or hydroxide is added in a later stage.

EXAMPLES 1–9

The examples below show various compositions of core or mold mixes according to this invention. In all examples, a core sand was used having an average grain size of 0.27 mms., to which the additives were added in the proportions given below (in percent based on the dry weight of the sand). From the mixes, cores were made of which some were allowed to self-harden, and some were heated with carbon dioxide which was blown through the core for 20 seconds at a pressure of 2 atmospheres. Compressive strength tests on cores thus treated were made after the times indicated below. Further, the green strength was determined for each mix.

The compositions of the core mixes are given in Table I, while the results are tabulated in Table II.

*Table I*

| Example | 1 | 2 | 3 | 4 | 5 | 6 | 7 | 8 | 9 |
|---|---|---|---|---|---|---|---|---|---|
| Aluminous cement | 0.2 | 0.5 | 1.0 | 1.5 | 2.0 | 4.0 | 0.5 | 1.0 | 2.0 |
| Calcium hydroxide | 3.2 | 3.2 | 3.2 | 3.2 | 3.2 | 3.2 | 3.2 | 3.2 | 3.2 |
| Ethyl-hydroxyethyl-cellulose | 0.4 | 0.4 | 0.4 | 0.4 | 0.4 | 0.4 | 0.4 | 0.4 | 0.4 |
| Molasses | 0.2 | 0.2 | 0.2 | 0.2 | 0.2 | 0.2 | 0.2 | 0.2 | 0.2 |
| Petroleum | 0.2 | 0.2 | 0.2 | 0.2 | 0.2 | 0.2 | 0.2 | 0.2 | 0.2 |
| Water | 3.0 | 3.0 | 3.0 | 3.0 | 3.0 | 3.0 | 4.0 | 4.0 | 4.0 |

*Table II*

| Ex. | Green compressive strength, gs. per sq. mms. | Self-hardening Dry compressive strength, gs. per sq. mm. after— | | | | | | Treatment with CO₂ Dry compressive strength, gs. per sq. mms. after— | | | | | | |
|---|---|---|---|---|---|---|---|---|---|---|---|---|---|---|
| | | 1 h. | 2 h. | 4 h. | 6 h. | 8 h. | 24 h. | 0 h. | 1 h. | 2 h. | 4 h. | 6 h. | 8 h. | 24 h. |
| 1 | 1.26 | | | | | | 22 | 48 | 79 | 83 | 102 | 122 | 149 | 203 |
| 2 | 1.28 | | | | 20 | 21 | 39 | 50 | 80 | 93 | 128 | 146 | 159 | 222 |
| 3 | 1.30 | | 19 | 27 | 37 | 44 | 66 | 48 | 91 | 94 | 142 | 180 | 196 | 312 |
| 4 | 1.20 | | 24 | 38 | 40 | 45 | 69 | 47 | 70 | 98 | 129 | 179 | 180 | 241 |
| 5 | 1.32 | 22 | 34 | 48 | 56 | 62 | 107 | 55 | 92 | 131 | 191 | 201 | 235 | 350 |
| 6 | 1.42 | 31 | 42 | 60 | 79 | 80 | 113 | 59 | 94 | 142 | 204 | 204 | 260 | 297 |
| 7 | 0.94 | | | 18 | 22 | 26 | 43 | 37 | 60 | 69 | 91 | 123 | 149 | 274 |
| 8 | 0.96 | | 20 | 29 | 37 | 39 | 60 | 38 | 63 | 85 | 125 | 131 | 182 | 360 |
| 9 | 1.07 | 22 | 35 | 51 | 62 | 83 | 103 | 42 | 89 | 137 | 194 | 236 | 258 | 360 |

EXAMPLE 10

(a) To sand of the same type as in the above examples there were added, based on the weight of the sand, 2% aluminous cement, 3.6% lime, 0.4% ethyl-hydroxyethyl-cellulose and 4.0% water. Test cores were made from the mix and treated with carbon dioxide as in Examples 1–9. The compressive strength was determined after storage for various times.

(b) A similar mix was prepared without the aluminous cement, test cores made therefrom and treated in the same way.

The results are indicated in the table below.

*Table III*

|  | Compressive strength, gs. per sq. mm. ||
|---|---|---|
|  | (a) | (b) |
| Immediately after CO₂-treatment | 50 | 40 |
| After 4 hrs | 120 | 60 |
| After 8 hrs | 160 | 80 |
| After 12 hrs | 200 | 100 |
| After 24 hrs | 420 | 200 |

EXAMPLE 11

A sand mix was prepared as in Example 10(a), but containing also 0.5% melamine resin. Test cores made from this mix gave the following strength values.

*Table IV*

Compressive strength, gs. per sq. mm.
Immediately after $CO_2$ treatment ___ 90
After 4 hrs. ___ 280

*Table IV—Continued*

Compressive strength, gs. per sq. mm.
After 8 hrs. ___ 335
After 12 hrs. ___ 380

I claim:

1. A method of making sand molds or cores for metal casting, comprising adding to sand aluminous cement in an amount of 0.1 to 5% by weight based on the weight of the sand, an alkaline earth metal compound selected from the group consisting of alkaline earth oxides and alkaline earth hydroxides in an amount of 0.2 to 8% by weight based on the weight of the sand, and a water-soluble cellulose derivative in an amount of 0.05 to 4% by weight based on the weight of the sand, forming molds or cores therefrom, and hardening said molds or cores.

2. A method as in claim 1, in which said molds or cores are allowed to self-harden at room temperature.

3. A method as in claim 1 in which said molds or cores are hardened by treatment with carbon dioxide.

4. A method as in claim 1, in which a surface-active agent is also added to the sand.

References Cited by the Examiner

UNITED STATES PATENTS

| 2,081,558 | 5/37 | Prange | 106—38.3 |
| 2,887,392 | 5/59 | Lolley | 106—38.3 |
| 2,987,789 | 6/61 | Moren | 22—193 |

FOREIGN PATENTS 570,816  9/58  Belgium.

MARCUS U. LYONS, *Primary Examiner.*

MICHAEL V. BRINDISI, *Examiner.*